J. F. MacKAY.
AIR SUPPLY DEVICE FOR BROODERS AND THE LIKE.
APPLICATION FILED APR. 14, 1915.
1,241,641.
Patented Oct. 2, 1917.
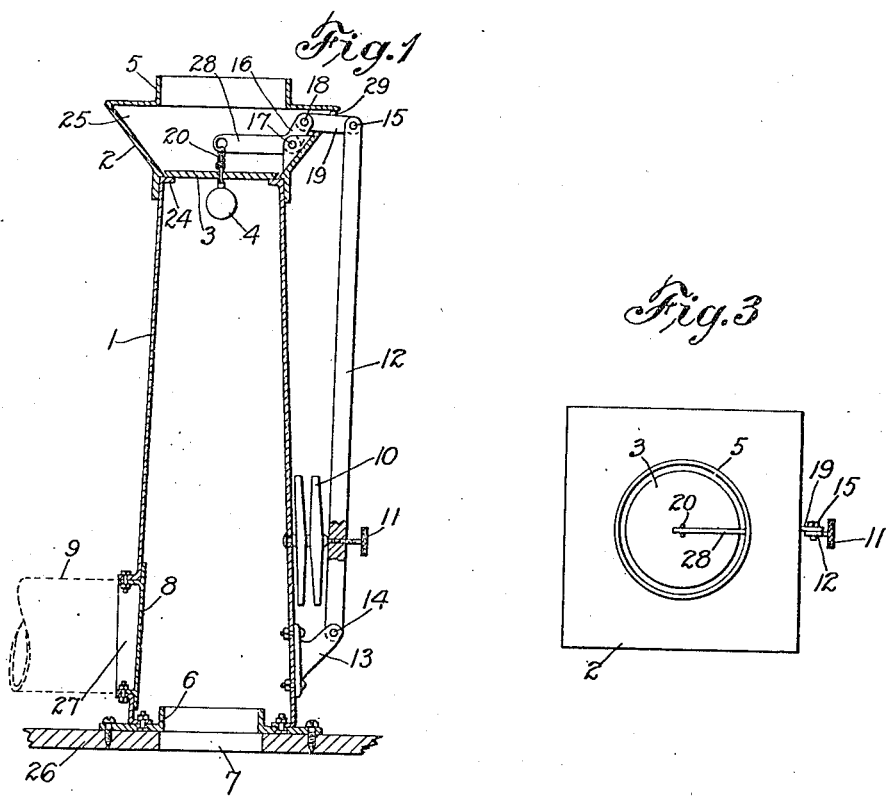
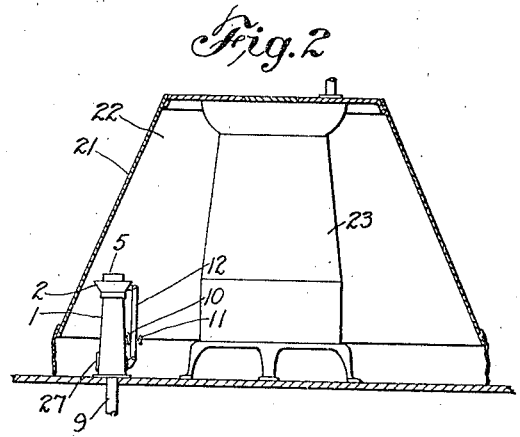
Inventor
John F. MacKay,
per Fred B. Walker,
Atty.

UNITED STATES PATENT OFFICE.

JOHN F. MACKAY, OF BORDENTOWN, NEW JERSEY.

AIR-SUPPLY DEVICE FOR BROODERS AND THE LIKE.

1,341,641.  Specification of Letters Patent.  Patented Oct. 2, 1917.

Application filed April 14, 1915. Serial No. 21,401.

*To all whom it may concern:*

Be it known that I, JOHN F. MACKAY, a citizen of the United States, residing at Bordentown, in the county of Burlington and State of New Jersey, have invented certain new and useful Improvements in Air-Supply Devices for Brooders and the Like, of which the following is a specification, reference being had therein to the accompanying drawing.

My present invention relates to an automatic fresh air supply device for colony and other brooders or similar structures. The object is to enable a stream of atmospheric air to be supplied automatically as needed and variable in amount to suit conditions without the creation of a draft that in every instance is dangerous and often fatal to the chicks. The invention consists, therefore, in an independent thermostatically-operated device adapted to be arranged in relation to a brooder stove having a hood which forms a brooder chamber surrounding the stove, so that accordingly as the heat rises or falls, the proper amount of pure outside air may be delivered by means of the device into the brooder chamber; and the invention also comprises numerous details and peculiarities in the construction, arrangement and combination of parts, substantially as will be hereinafter described and then more particularly pointed out in the claims.

In the accompanying drawing illustrating my invention:

Figure 1 is a vertical section of my improved automatic air supply device for colony brooders and the like;

Fig. 2 is a vertical section of a brooder stove and the hover supported thereon with my improved air supply device situated in the brooder chamber to show its function and relative arrangement;

Fig. 3 is a top plan view of the device.

Similar characters of reference designate corresponding parts throughout the different figures of the drawing.

At the present time in the ordinary processes of raising incubator-hatched chicks and with most of the appliances used with incubators, colony brooders, brooder house systems and other analogous apparatus for the raising of fowl and poultry, there is no fresh air delivery or supply to any of them. Incubation can be very much improved by the use of a supply of fresh air, but the difficulty is to introduce the same where the chicks can use it without at the same time creating a strong draft or air blast, which is apt to kill the birds as soon as it strikes them. Heretofore there has been no appliance operating automatically to introduce fresh air in a proper regulated quantity and at the same time not create a dangerous or injurious draft. My appliance creates no draft and can be made large or small, being adapted for all sorts of chicken-hatching and raising apparatus, and may be used in the chamber of an incubator in a form so small that it does not interfere with the egg trays, and it can also be used in any kind of a colony brooder, brooder house system, or the like, acting when desired to not only supply the fresh air, but to support the hover and to introduce fresh oxygen into the brooder chamber.

1 designates an upright barrel or cylinder which constitutes the main casing of my improved air supplying device. This is designed to be located alongside of a stove, as the stove 23 under the hover 21 which is supported from the top of the stove and inside of the brooder chamber 22 which surrounds the stove, it being obvious that these parts 21, 22, and 23, as shown in Fig. 2, are offered merely by way of example, and without any thought of confining myself thereto.

The main casing 1 has an open upper end which is provided with a cover 3 acting as an air valve and seated upon the top flange or periphery 24 of the casing 1. Also the upper end of the casing supports a casting 2 which provides a chamber 25 to permit the valve 3 to play up and down vertically therein, and to contain also a portion of the leverage devices for lifting said valve. This casting 2 is furnished with an outlet opening 5 at the top, through which the air passes upwardly through the casing 1 and by the valve 3 may emerge into the brooder chamber or other place where my improved automatic air supply is located. This casing 1 rests at its lower end upon the floor 26 of the colony house. If the floor is of wood or other material that can easily be pierced with a pipe for introducing air from the outside atmosphere, then I find it preferable to follow this practice and allow the air to enter through the opening in the flooring 26 and through the opening 6 into the lower end of the main casing 1; but in cases where the flooring of the colony house or other building is of concrete or hard paving so that it is not easy to admit the air through it, then I provide the casing 1 near the lower end thereof in its side with an opening 27 to which runs a pipe 9 from some point outside of the house. This opening 27 may be made in the casing 1 and covered with a plate 8 bolted thereto when the opening is not in use, leaving the lower opening 6 to be used at this time, but whenever desired the opening 6 can be closed and the opening 27 used by removing the cover 8. Obviously, therefore, air can enter the lower end either by the bottom or at the side.

The valve 3 at the top of the device is automatically controlled by a thermostat 10 located at some suitable point where it is exposed to the temperature of the atmosphere within the brooder chamber, so that it will expand and contract as the degree of heat rises and falls. 10 denotes an example of such a thermostat attached to the outside wall of the casing 1 near the bottom thereof and having an adjusting screw 11 to regulate the tension of the parts. This thermostat operates the vertical lever 12 pivoted at 14 to a bracket 13 bolted to the lower part of the wall of casing 1. The upper part of lever 12 is pivoted at 15 to a link 19, the other end of which is pivoted at 18 to a bent lever 16 pivoted at 17 on the inside of the top casing 2, said lever 16 having an arm 28 which is loosely attached to the center of the valve plate 3 by means of a chain 20 or some other suitable means. The link 19 passes through a slot 29 in the wall of casing 2. A weight 4 is fastened beneath the valve plate 3 so as to assist in returning it to place when the thermostat releases the levers and allows the valve to close.

The operation will be manifest from the foregoing description of the construction and relative arrangement of the various parts. When the device is located under the hood, as 21, and properly connected with the outside atmosphere, so as to allow pure cold air to enter the same, such air will be discharged through the upper end of the casing 1 and out into the brooder chamber through the top opening 5 in quantities which will vary with the degree of opening of the valve 3, the opening of which will be controlled by the thermostat through the leverage connecting said thermostat with the valve 3; and thus when the brooder chamber becomes well heated, the expansion of the thermostat will push the lever 12 outwardly and this will actuate the crank lever 16 and lift the valve 3 off its seat 24 so that fresh air will begin to pass into the brooder chamber. The degree at which the thermostat will operate can be set by means of the screw 11 at any figure, say 100 degrees or otherwise, so that the valve 3 will open when this temperature is attained. When the colony brooder fire in the stove 23 is low and the degree of heat too low to heat the fresh air supply which the device delivers to the brooder chamber, the thermostat will contract and the valve 3 will close, but it will open again as soon as the temperature in the brooder rises to a point where it is able to take care of copious amounts of fresh air.

Various changes may be made in the exact construction and relative arrangement of the various parts without exceeding the scope of my invention, and I reserve the liberty of making such changes as may be found desirable, convenient or necessary in the practical application of the invention for producing the best results.

Having thus described my invention, what I claim as new and desire to secure by Letters Patent, is:

1. A device for supplying colony or other brooders or like apparatus with pure fresh air, consisting of a main barrel adapted to be located in a heated chamber, means for admitting fresh air to said barrel, an outlet valve for said air located within the barrel transversely of the same at a point below the upper end of the latter so that an outlet chamber is provided above said valve, and a thermostatic appliance external to the barrel and within the heated chamber, which appliance operates the outlet valve.

2. A unitary self-contained device for automatically supplying fresh air to a brooder, incubator, or the like, consisting of a main upright barrel or casing, an outlet valve therein near the upper end consisting of a vertically movable transverse plate located at a distance below the top of the casing, there being a chamber above said valve, means for admitting pure air in the lower portion of the main barrel, a thermostatic appliance on the outside of the barrel and subject to the influence of heated air in a brooder or the like, and lever connections between said appliance and the outlet valve for operating the latter.

3. An anti-draft device for supplying pure air to a brooder or the like, consisting of a vertical barrel having a flanged top, a cover resting on said top and vertically movable with relation thereto so as to serve as a valve, a casting supported on the upper end of the barrel above the valve and serving as an outlet chamber for the air, means for admitting cold air at the lower end of the main barrel, an external thermostatic appliance on said barrel subject to the influence of heated air, and lever connections between said appliance and the outlet valve whereby the latter is opened as required.

In testimony whereof I affix my signature.

JOHN F. MacKAY.